US008298062B2

(12) United States Patent
Kido

(10) Patent No.: US 8,298,062 B2
(45) Date of Patent: Oct. 30, 2012

(54) GAMING MACHINE THAT NAVIGATES DEALER IN A GAME OPERATION INPUT IN ROULETTE GAME

(75) Inventor: Katsuhiro Kido, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 430 days.

(21) Appl. No.: 12/777,539

(22) Filed: May 11, 2010

(65) Prior Publication Data

US 2010/0304827 A1 Dec. 2, 2010

(30) Foreign Application Priority Data

May 29, 2009 (JP) ................................ 2009-130698

(51) Int. Cl.
*A63F 9/24* (2006.01)
*A63F 13/00* (2006.01)

(52) U.S. Cl. ................ 463/17; 463/22; 463/31; 463/43

(58) Field of Classification Search .................... 463/17, 463/22, 31, 43
See application file for complete search history.

(56) References Cited

U.S. PATENT DOCUMENTS

| | | | | |
|---|---|---|---|---|
| 5,393,067 | A * | 2/1995 | Paulsen et al. | 273/292 |
| 5,743,798 | A * | 4/1998 | Adams et al. | 463/17 |
| 5,779,546 | A * | 7/1998 | Meissner et al. | 463/25 |
| 6,179,710 | B1 * | 1/2001 | Sawyer et al. | 463/16 |
| 6,755,741 | B1 * | 6/2004 | Rafaeli | 463/25 |
| 6,835,133 | B2 * | 12/2004 | Baerlocher et al. | 463/20 |
| 7,264,241 | B2 * | 9/2007 | Schubert et al. | 273/149 R |
| 7,311,305 | B2 | 12/2007 | Matsuno et al. | |
| 7,407,438 | B2 * | 8/2008 | Schubert et al. | 463/22 |
| 7,933,448 | B2 * | 4/2011 | Downs, III | 382/181 |
| 7,950,663 | B2 * | 5/2011 | Schubert et al. | 273/149 R |
| 2008/0051182 | A1 | 2/2008 | Kido | |
| 2008/0058069 | A1 | 3/2008 | Kido | |
| 2008/0081693 | A1 | 4/2008 | Kido | |
| 2008/0113783 | A1 * | 5/2008 | Czyzewski et al. | 463/29 |
| 2009/0140492 | A1 * | 6/2009 | Yoseloff et al. | 273/149 R |
| 2009/0224476 | A1 * | 9/2009 | Grauzer et al. | 273/149 P |
| 2009/0302540 | A1 * | 12/2009 | Snow et al. | 273/292 |
| 2010/0016050 | A1 * | 1/2010 | Snow et al. | 463/12 |
| 2010/0062845 | A1 * | 3/2010 | Wadds et al. | 463/30 |
| 2010/0062861 | A1 | 3/2010 | Kido | |
| 2010/0113120 | A1 * | 5/2010 | Snow | 463/16 |

OTHER PUBLICATIONS

U.S. Appl. No. 12/776,662, filed May 10, 2010, Kido.

* cited by examiner

*Primary Examiner* — Steven J Hylinski
(74) *Attorney, Agent, or Firm* — Lexyoume IP Meister, PLLC

(57) ABSTRACT

The present invention has an object of providing a gaming system that can allow a game to be advanced even by an inexperienced dealer. CPU counts a time by a timer as upon triggering at a predetermined timing, on a time axis on which the roulette game is advanced based on control of the roulette game control unit and displays on dealer-used display an instructional image stored to be associated with a timing data, in response to a time counted by the timer matching a time indicated by timing data stored in ROM.

3 Claims, 14 Drawing Sheets

FIG. 12

ROLLING-TIME TABLE

| BALL-SPEED SETTING VALUE | ROLLING TIME |
|---|---|
| 1 | 14 SECONDS |
| 2 | 13 SECONDS |
| 3 | 12 SECONDS |
| 4 | 11 SECONDS |

FIG. 13

FIRST TIMING TABLE

| FIRST TIME | CONTENTS OF PROCESSING |
|---|---|
| 5 SECONDS | BALL THROWING NAVIGATION PROCESSING |

FIG. 14

SECOND TIMING TABLE

| BALL-SPEED SETTING VALUE | SECOND TIME | CONTENT OF PROCESSING |
|---|---|---|
| 1 | 13 SECONDS | BET-ACCEPTANCE END NAVIGATION PROCESSING |
| 2 | 12 SECONDS | |
| 3 | 11 SECONDS | |
| 4 | 10 SECONDS | |

FIG. 17

NAVIGATION PATTERN TABLE

| NAVIGATION PATTERN NUMBER | BET START | BALL SUPPLY | BET END |
|---|---|---|---|
| PATTERN 1 | × | ○ | ○ |
| PATTERN 2 | × | × | ○ |
| PATTERN 3 | ○ | × | ○ |
| PATTERN 4 | ○ | ○ | ○ |

FIG. 18

FOURTH TIMING TABLE

| FOURTH TIME | CONTENTS OF PROCESSING |
|---|---|
| 10 SECONDS | BET-ACCEPTANCE START NAVIGATION PROCESSING |

GAMING MACHINE THAT NAVIGATES DEALER IN A GAME OPERATION INPUT IN ROULETTE GAME

CROSS REFERENCE TO RELATED APPLICATIONS

This application is based on and claims the benefit of priority from Japanese Patent Application No. 2009-130698, filed on May 29, 2009, the content of which is incorporated herein by reference.

BACKGROUND OF THE INVENTION

1. Field of the Invention

The present invention relates to a gaming machine that navigates a dealer in a game operation input in a roulette game.

2. Related Art

Various table games are known conventionally, for example, as disclosed in U.S. Pat. No. 7,311,305, and among the table games, there exists a game genre called roulette games.

In a roulette game device, the player purchases or borrows one or more medals from a medal feeder and starts the game by inserting the medal into the gaming machine. If the player wins the game, a predetermined number of medals are paid out. Therefore, a player who has obtained many medals through this can enjoy the roulette game continuously without purchasing or borrowing new medals.

Here, when a mark (number) arranged on the roulette wheel is selected by a player, the roulette wheel rotates and the ball that has been thrown rolls on the roulette wheel. Then, when the rotation of the roulette wheel slows down and the ball falls into any of the pockets in the roulette wheel, it is determined whether the mark (number) selected by the player and a mark (number) in which the ball is held are matching (winning). Here, when it is determined that the ball is held (win) in a pocket of the same mark (number), medals are paid out to the player at a predetermined rate.

SUMMARY OF THE INVENTION

For casino games such as a roulette game, since a dealer advances the game, it is necessary for the dealer to be proficient in game advancement. However, for countries in which development of casinos has only started, there has been a problem in that there is a shortage of dealers proficient in game advancement.

The present invention has an object of providing a gaming machine that can allow a game to be advanced even by an inexperienced dealer, by way of displaying an instructional image of a game operation input on a display device.

According to a first aspect of the invention, a gaming system is provided which includes a plurality of stations, a display that is disposed to be viewable to a dealer and displays an instructional image of a game operation input, an operation input device that accepts a game operation input from the dealer and outputs a signal based on the game operation input thus accepted, and a roulette game control unit that performs transmission and reception of information related to a roulette game with the plurality of stations, the display, and the operation input device, and advances the roulette game, in which the roulette game control unit comprises: a roulette wheel on which a plurality of marks is disposed; a ball that rolls on the roulette wheel; a plurality of pockets that is formed in a circumferential direction of the roulette wheel to correspond to the plurality of marks, and holds the ball; a timer that counts time; memory that stores, on a time axis on which the roulette game is advanced based on control of the roulette game control unit, timing data that is used for determining a timing to display on the display the instructional image indicating a timing of an operation by way of the operation input device; and a controller that executes processing of: (a) counting, upon a trigger that is set in advance, a time by the timer, on a time axis on which the roulette game is advanced based on control of the roulette game control unit; and (b) displaying on the display an instructional image stored to be associated with the timing data, in response to a time counted by the timer matching a time indicated by timing data stored in the memory.

According to the first aspect of the invention, the controller displays an instructional image stored to be associated with the timing data on the display, in response to a time counted by the timer matching a time indicated by timing data stored in the memory. Accordingly, even in the case of the dealer being inexperienced, a required operation timing of the operation input device can be easily determined according to a plurality of game steps in a unit game of a roulette game.

According to a second aspect of the invention, a gaming system is provided which includes a plurality of stations, a display that is disposed to be viewable to a dealer and displays an instructional image of a game operation input, an operation input device that accepts a game operation input from the dealer and outputs a signal based on the game operation input thus accepted, and a roulette game control unit that performs transmission and reception of information related to a roulette game with the plurality of stations, the display, and the operation input device, and advances the roulette game, in which the roulette game control unit comprises: a roulette wheel on which a plurality of marks is disposed; a ball that rolls on the roulette wheel; a plurality of pockets that is formed in a circumferential direction of the roulette wheel to correspond to the plurality of marks, and holds the ball; memory that stores in advance first timing data that is associated with processing to display on the display an instructional image of an operation input for throwing the ball on the roulette wheel and second timing data that is associated with processing to display on the display an instructional image of an operation input for ending acceptance of a bet; a timer that counts time; and a controller that performs processing of: (a) starting acceptance of a bet from each of the plurality of stations; (b) counting a first time by the timer upon the processing of (a); (c) referring to the memory, and displaying on the display an instructional image of an operation input for throwing the ball on the roulette wheel in response to a first time counted by the timer matching a time indicated by first timing data; (d) throwing the ball on the roulette wheel in response to reception of a signal indicating the ball being thrown from the operation input device; (e) counting a second time by the timer upon the processing of (d); (f) referring to the memory, and displaying on the display an instructional image of an operation input for ending acceptance of a bet in response to the second time counted by the timer matching a time indicated by the second timing data; and (g) ending acceptance of a bet from each of the plurality of stations in response to reception of a signal indicating the acceptance of a bet being ended from the operation input device having been received.

According to the second aspect of the invention, the controller displays an instructional image of an operation input for throwing the ball on the roulette wheel on the display, in response to the first time counted by the timer matching a time indicated by first timing data. Accordingly, even in the case of the dealer being inexperienced, the coming of the timing to throw the ball can be determined.

In addition, the controller throws the ball on the roulette wheel in response to receiving a signal indicating throwing the ball from the operation input device. Accordingly, the ball can be thrown onto the roulette wheel by the dealer operating the operation input device.

Furthermore, the controller displays an instructional image of an operation input for ending acceptance of bets on the display, in response to the second time counted by the timer matching a time indicated by the second timing data. Accordingly, even in the case of the dealer being inexperienced, the coming of the timing to end acceptance of bets can be determined.

In addition, the controller ends acceptance of bets from each of the plurality of stations in response to receiving a signal indicating ending acceptance of bets from the operation input device. Accordingly, even in the case of the dealer being inexperienced, it is possible to end acceptance of bets.

According to a third aspect of the present invention, a gaming system according to the second aspect is provided in which the memory stores in advance a time from when the ball is thrown until held in the pocket, to correspond to the speed of the ball, and the controller executes the following processing of: (h) counting a third time from when the ball is thrown until a bet is accepted from each of the plurality of stations by the timer in each of the plurality of stations in response to the processing of (d); (i) determining, for each of the plurality of stations, whether the third time counted by the timer is longer than a time from when the ball is thrown until held in the pocket stored in the memory; and (j) invalidating a bet from a station which is determined to be longer in the processing of (i).

According to the third aspect of the invention, even in a case in which a bet has been made from a certain station after the ball falls into a pocket, it is possible to invalidate the bet from this station.

The present invention has an object of providing a gaming system that can allow a game to be advanced even by an inexperienced dealer.

BRIEF DESCRIPTION OF THE DRAWINGS

FIG. 12 is a diagram showing a rolling-time table according to the present invention;

FIG. 13 is a diagram showing a first timing table according to the present invention;

FIG. 14 is a diagram showing a second timing table according to the present invention;

FIG. 17 is a diagram showing a navigation pattern table according to the present invention;

FIG. 18 is a diagram showing a fourth timing table according to the present invention;

DETAILED DESCRIPTION OF THE INVENTION

Embodiments of the present invention are explained below with reference to the drawings.

Figure 1:
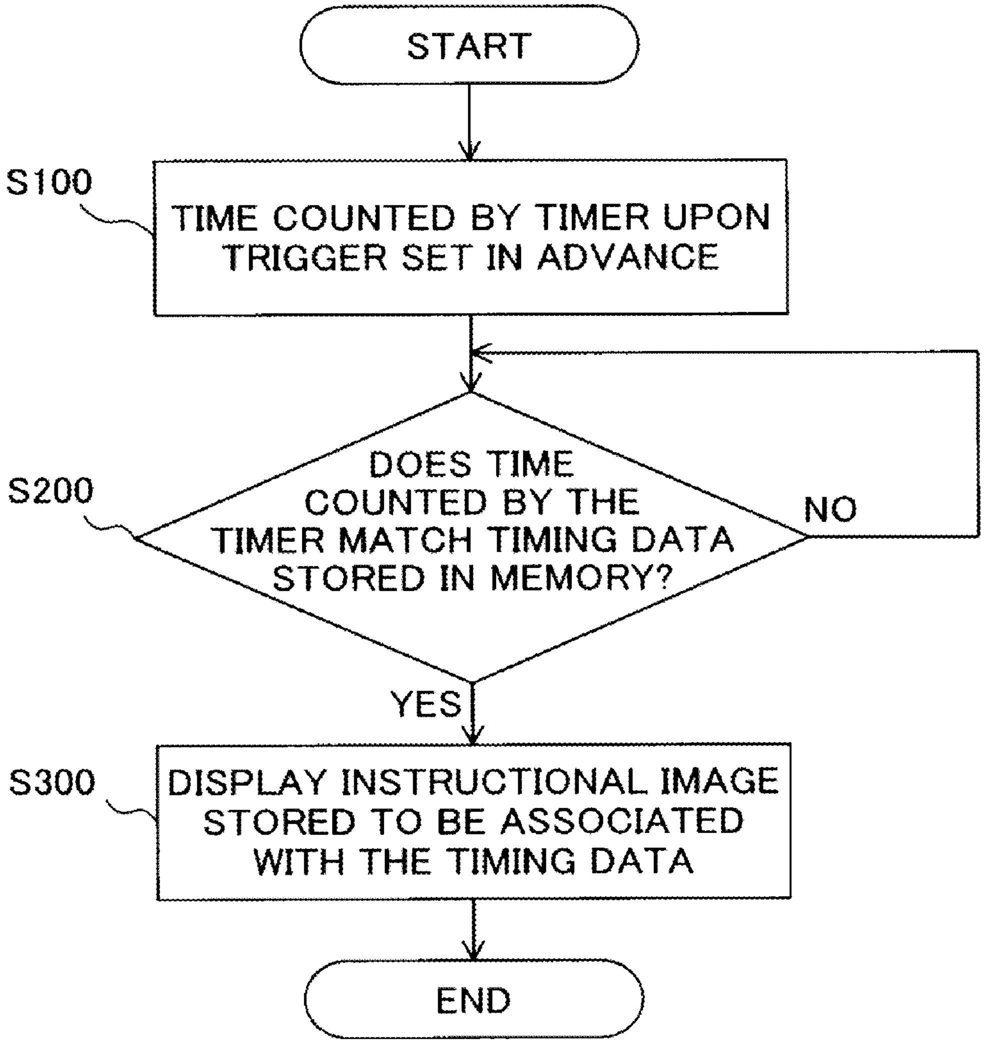
FIG. 1 is a flowchart showing an outline of navigation of an operation input to a dealer in a roulette game of the present invention.

Although described later in detail, as shown in FIG. 1, a CPU 81 counts a time with a timer 231 upon a trigger set in advance occurring (for example, when a previous game described below ends), on a time axis on which the roulette game is advanced based on control of the roulette game control unit 10 (Step S100), determines as to whether a time counted by the timer 231 matches a time (for example, a fourth time described below) indicated by timing data stored in ROM 82 (Step S200), and displays on a dealer-used display 210 an instructional image stored to be associated with timing data, in response to matching (Step S300).

Figure 2:
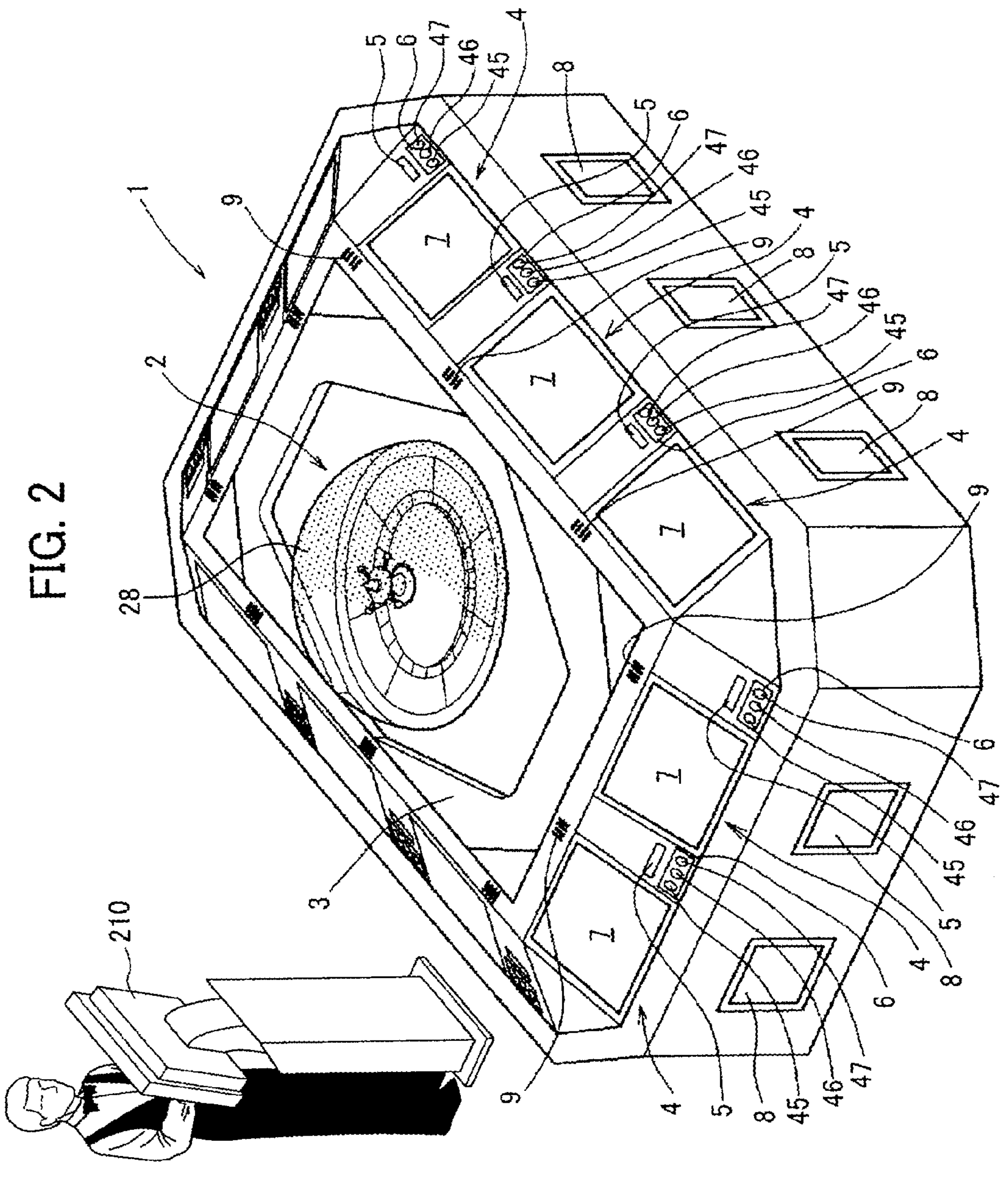
FIG. 2 is a perspective view showing an external view of a roulette game device according to the present invention.

FIG. 2 is an external perspective view showing a schematic configuration of the roulette game machine. As shown in FIG. 2, the roulette game device 1 mainly includes a cabinet 3 as a main body, a roulette device 2 disposed substantially at a central portion of an upper face of the cabinet 3, a plurality of satellites 4 (for example, 10 satellites) that are disposed so as to surround the roulette device 2 at a periphery of the roulette device 2, a dealer-used display 210 that is disposed so as not to be visible to a player sitting at each station 4, and a roulette game control unit 10 (described later in FIG. 6) including the roulette device 2.

Here, the satellites 4 are gaming areas that at least include a medal insertion opening 5 to which game media such as currency or medals to be used for playing the game are inserted, a control unit 6, which is configured with a plurality of control buttons and the like to which a predetermined instruction is inputted by the player, and an image display unit 7 that allows an image related to a game to be displayed. Then, the player may advance a game by operating the control unit 6 or the like while viewing the image displayed on the image display unit 7.

In addition, a medal payout opening 8 is respectively provided on sides of the housing 3 on which each satellite 4 is arranged. Furthermore, a speaker 9 that projects music, sound effects and the like, is provided at the upper right of the image display device 7 of each satellite 4.

Then, a medal sensor (not illustrated) is provided inside of the medal insertion opening 5, and this performs identification of game media such as medal inserted by way of the medal insertion opening 5, while counting the medals thus inserted. In addition, a hopper (not illustrated) is provided inside of the medal payout opening 8, and a predetermined number of medals are paid out from the medal payout opening 8.

Next, configurations of a control unit 6 and an image display device 7 are explained. As illustrated in FIG. 2, the control unit 6 is provided at a side of the image display unit 7 and includes buttons operated by a player. More specifically, a bet selection button 45, a payout (cash-out) button 46, and a help button 47 are provided in order, starting from the left as viewed from a position facing the satellite 4.

The bet selection button 45 is a button provided for a player to press so as to confirm betting through the image display unit 7 (described later) after a bet operation is completed. Then, betting is confirmed, and in a case in which a bet is placed on the mark 24 that corresponds to the number pocket 23 in which the ball 11 fell in at the roulette device 2 in a game, the player wins an award. When the player wins an award, credit corresponding to the number of chips bet is added to the current credit of the player.

The payout button 46 is a button which is usually pressed at the end of a game. When the payout button 46 is pressed, medals corresponding to the current credit (normally, 1 medal for 1 credit) that the player has acquired through the game is paid out from the payout slot 8.

The help button 47 is a button that is pressed in a case where a method of operating the game is unclear, and upon the help button being pressed, a help screen showing various kinds of operation information is displayed immediately thereafter on the image display unit 7.

On the other hand, the image display unit 7 is a so-called touch-panel type of liquid crystal display, on the front surface of which a touch panel 48 is attached, allowing a player to perform selections by pressing, e.g., with a finger, icons displayed on a liquid crystal screen.

Figure 3:
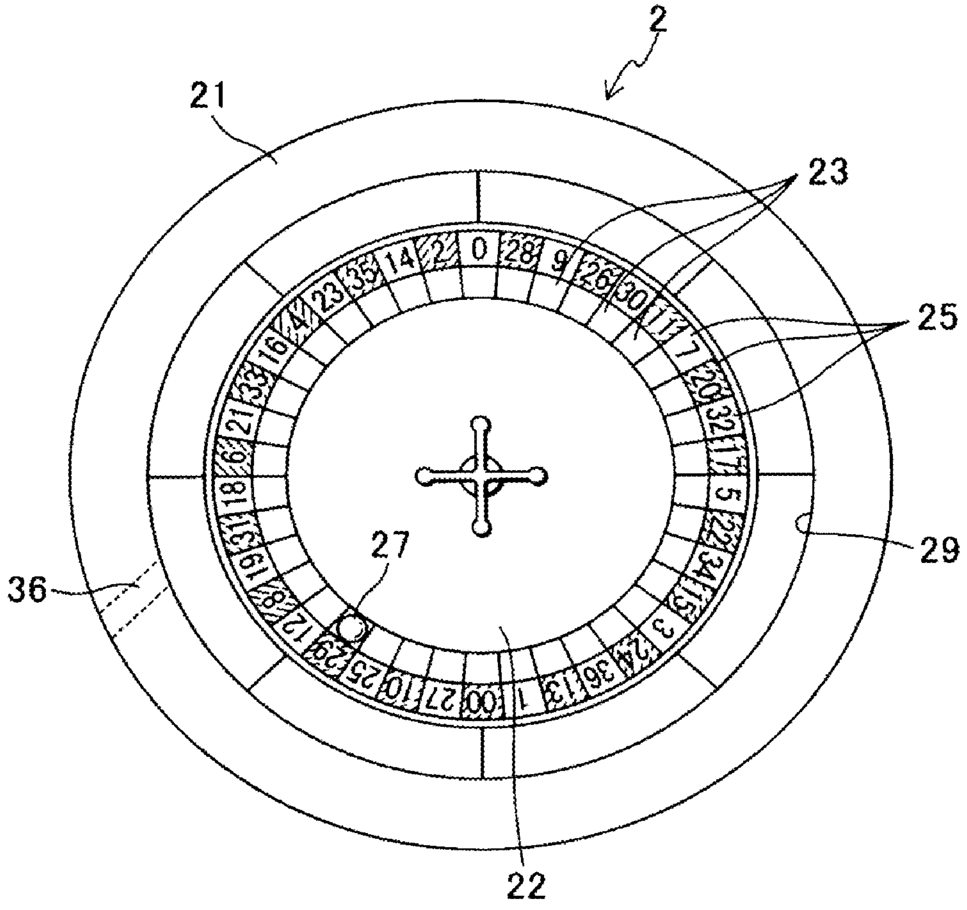
FIG. 3 is a plan view showing a roulette device according to the present invention.

The roulette device 3, as shown in FIG. 3, is configured to have a frame body 21 that is fixed to the cabinet 2, and a wheel 22 that is held and supported inside the frame body 21 to be rotatable. Here, the wheel 22 has a number of number pockets 23 (38 number pockets in the present embodiment) formed in the shape of recesses on the upper face of the wheel 22. Furthermore, at the outer side of the respective number pocket 23 on an upper surface of the wheel 22, number display plates 25 are formed on which each number "0", "00", "1" to "36" is displayed respectively as a mark, which corresponds to each number pocket 23. In other words, a total of 38 number pockets 23 are formed on the wheel 22, each of which has a corresponding number from among the numbers "0", "00", and "1" to "36".

Furthermore, a ball throwing opening 36 is formed within the frame body 21. Here, a ball throwing device (not shown) is connected to the ball throwing opening 36, which allows a ball 27 to be thrown onto the wheel 22 from the ball throwing opening 36 by driving the ball throwing device. Furthermore, the entire area above the roulette device 3 is covered with a transparent acrylic cover member 28 formed in a hemispherical shape (see FIG. 2).

Furthermore, a win determination device 86 (see FIG. 6) is provided below the wheel 22. The win determination device 86 is provided for determining which one of the number pockets 23 has received the ball 27. Furthermore, a ball collecting device (not shown) is provided below the wheel 22. The ball collecting device is provided for collecting the ball 27 remaining on the wheel 22 after the game. It should be noted that the ball throwing device, the win determination device, and the ball collecting device are known devices, and, accordingly, detailed descriptions thereof will be omitted.

Here, the frame body 21 is formed such that it gently slopes toward the inner side, and has a guide wall 29 formed along an intermediate region. The guide wall 29 allows the ball 27 thus thrown to roll while guiding the ball 27 against its centrifugal force. As the ball 27 decreases in rotational speed, and thus loses centrifugal force, goes to the inside from rolling and falling on the slope of the frame body 21, and reaches the wheel 22 that is rotating. Then, the ball 27 having rolled into the wheel 22 passes over the number display plate 25 on the outer side of the wheel 22, which rotates further, and falls into any one among the number pockets 23. As a result, the win determination device 86 determines the number marked on the number display plate 25 that corresponds to the number pocket 23 holding the ball 27, which becomes the winning number.

Figure 4:
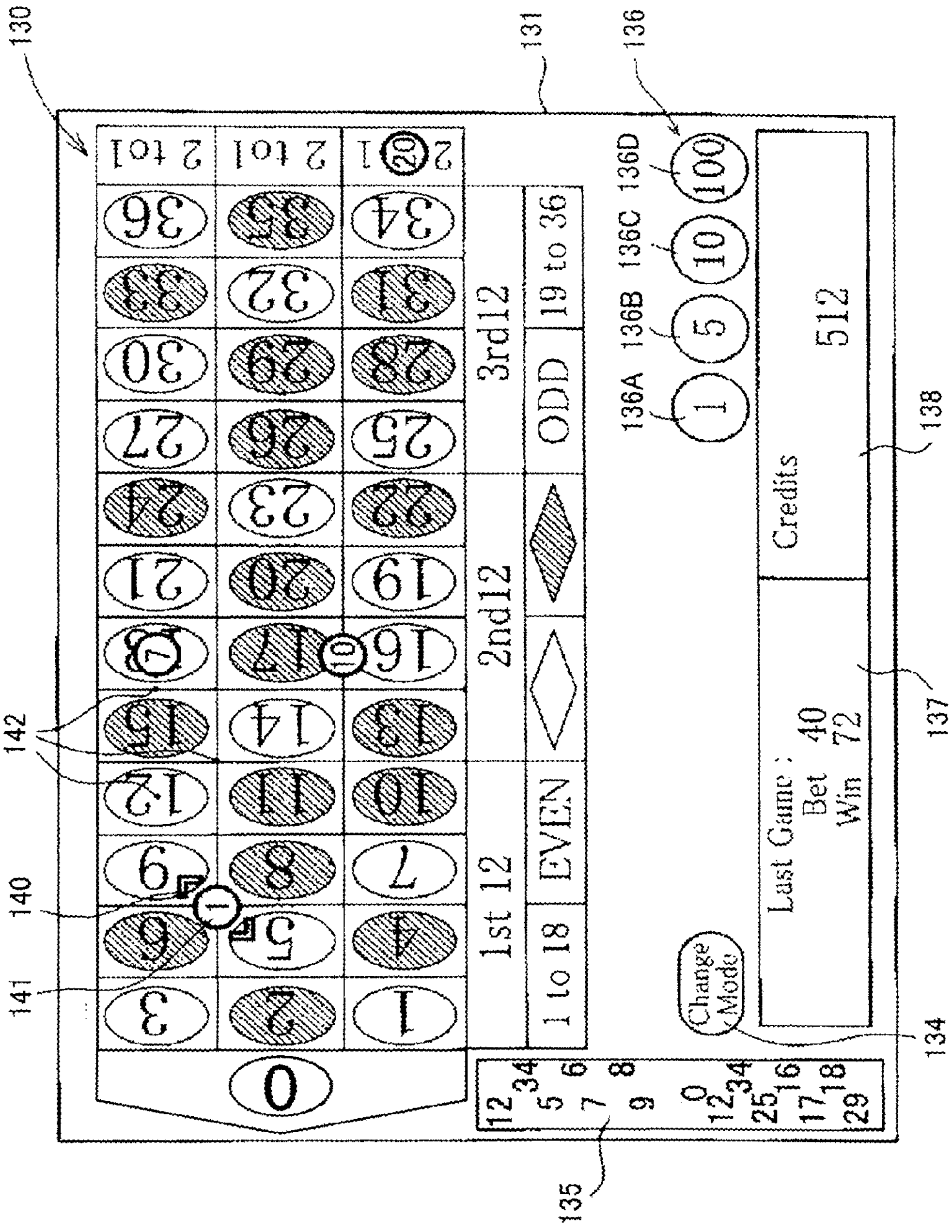
FIG. 4 is an illustrative diagram showing a bet screen of a table-type betting board according to the present invention.
Figure 5:
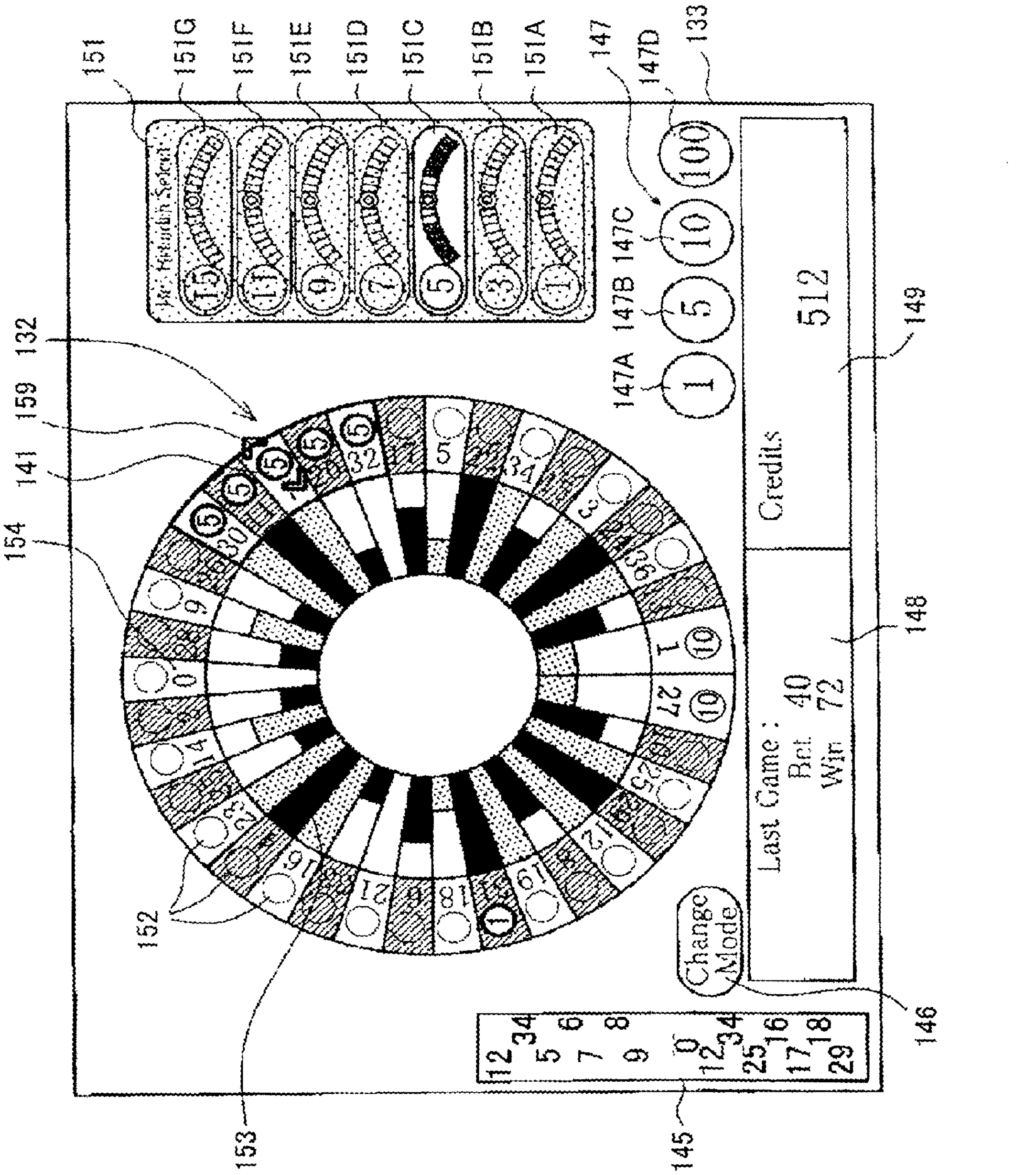
FIG. 5 is an illustrative diagram showing a bet screen of a wheel-type betting board according to the present invention.

FIGS. 4 and 5 are views illustrating examples of display screens displayed on the image display unit during a game.

As shown in FIGS. 4 and 5, two types of screens, which are a first bet screen 131 having a table-type betting board 130 and a second bet screen 133 having a wheel-type betting board 132, are displayed on the image display device 7 during a game of the roulette game machine 1. Then, it is possible to switch the display between the first bet screen 131 and the second bet screen 133 each time screen switching buttons 134 and 146 displayed on the screen are pressed. Then, after selecting either the first bet screen 131 or the second bet screen 133, the player can bet a chip using the player's credits.

Firstly, the first bet screen 131 is described with reference to FIG. 4. The table-type betting board 130 displayed on the first bet screen 131 has numbers displayed in the marks 24 that match the numbers "0", "00", and "1" to "36", which are displayed in the form of a matrix. Furthermore, special bet areas, which allow the player to bet on "odd numbers", "even numbers", "the color of the marks (red or black)", "a predetermined range of the numbers (e.g., "1" to "12")", are provided in the form of a matrix in the same way.

Then, below the table-type betting board 130, a result history display unit 135, a screen switching button 134, the bet unit button 136, a payout result display unit 137, and a credit amount display unit 138 are displayed in this order, starting from the left of the screen.

The result history display unit 135 displays the results of the winning numbers of the past games up to and including the preceding game in the form of a list. The term "one game" as used here represents a series of stages from a stage in which the player places bets via each satellite 4, up to a stage in which a credit is paid out according to the winning number after the ball 11 has fallen in the pocket 23. With such an arrangement, upon completing one game, a new winning number is added to the top field of the list, which has the capacity to allow the players to confirm the history of the winning numbers for a maximum of 16 games.

Furthermore, as described above, the screen switching button 134 is a button that switches the display between the first bet screen 131 and the second bet screen 133 displayed on the image display device 7. Then, when the player presses the screen switching button 134 on the liquid crystal screen, it is possible to display the first bet screen 131 using the table-type betting board 130 and the second bet screen 133 using the wheel-type betting board 132 by switching therebetween. Then, the player bets a chip based on the betting board on the screen that is currently displayed.

The bet unit buttons 136 are buttons that allow the player to place bets using chips on the bet area 142 (squares having a number or mark, or lines which define the squares) designated by the player. The bet unit button unit is configured with four kinds of buttons including a 1-bet button 136A, a 5-bet button 136B, a 10-bet button 136C, and a 100-bet button 136D.

With such an arrangement, first, the player designates the desired bet area 142 on which bets are to be placed, with a cursor 140 (described later) by using a player's finger to directly push the screen. In this stage, upon the player pushing the 1-bet button 136A, chips are bet in increments of one chip (the amount of chips bet is incremented in the order of "1", "2", "3", . . . for each time the player pushes the 1-bet button 136A with the player's finger or the like). Upon the player pushing the 5-bet button 136B, chips are bet in increments of five chips (the amount of chips bet is incremented in the order of "5", "10", "15", . . . for each time the player pushes the 5-bet button 136B with the player's finger or the like). Upon the player pushing the 10-bet button 136C, chips are bet in increments of ten chips (the amount of chips bet is incremented in the order of "10", "20", "30", for each time the player pushes the 10-bet button 136C with the player's finger or the like). Upon the player pushing the 100-bet button 136D, chips are bet in increments of one hundred chips (the amount of chips bet is incremented in the order of "100", "200", "300", . . . for each time the player pushes the 100-bet button 136D with the player's finger or the like). Such an arrangement simplifies the operation required for betting a large amount of chips.

In addition, the number of chips bet and payout credit amount for a player in a previous game are displayed in the payout result display unit 137. Here, a number obtained by subtracting the amount bet from the payout credits is the credits which the player has newly obtained by the previous game.

Furthermore, a credit amount display unit 138 displays the amount of credits which the player currently possesses. The credit amount decreases according to the number of chips bet (1 credit amount for 1 chip) when the player bets chips. Furthermore, in a case in which the player has won chips bet and credits are paid out, the credit amount is incremented by the credit amount thus paid out. It should be noted that the game is over in a case where the credit amount that the player possesses becomes zero.

Furthermore, a cursor 140 indicating the bet area 142, which the player has selected currently, is displayed on the table-type betting board 130. In addition, a chip mark indicating the bet area 142 and the number of chips bet up to this time is displayed. Here, the number displayed on the chip mark 141 represents the number of chips bet. For example, as shown in FIG. 4, a chip mark 141 of "7" disposed on the square "18" indicates that 7 chips have been bet to the number "18". In this way, a method for placing a bet on only one number is referred to as "straight up".

Furthermore, the chip mark 141 of "1" disposed at the intersection of the lines that define the squares "5", "6", "8", and "9" indicates that one chip has been bet so as to cover the four numbers "5", "6", "8", and "9". It should be noted that a method for placing a bet so as to cover four numbers as described above is referred to as "corner bet".

Examples of the other betting methods include: a "split bet" for placing a bet so as to cover two numbers by locating the chip on the line between squares of two numbers; a "street bet" for placing a bet so as to cover three numbers (e.g., "13", "14", and "15") by locating the chip at the edge of the row of the numbers (each row along the vertical direction in FIG. 9); a "line bet" for placing a bet so as to cover six numbers (e.g., "13", "14", "15", "16", "17", and "18") by locating the chip at the end of the line between two rows of numbers (two rows along the vertical direction in FIG. 9); a "column bet" for placing a bet so as to cover twelve numbers by locating the chip at any one of the squares having the mark "2 to 1"; and a "dozen bet" for placing a bet so as to cover twelve numbers by locating the chip at any one of the squares having respective marks of "1st 12", "2nd 12", and "3rd 12". In addition, examples of other betting methods include: placing a bet on the color ("red" or "black") of the marks 24; placing a bet on whether the number is an odd number or an even number; and placing a bet on whether the number will be 18 or less, or will be 19 or more, so as to cover eighteen numbers, using one of six squares provided at the lower end of the table-type betting board 130.

When the player places a bet via the first bet screen 131 thus configured as described above, first, the player designates the desired bet area 142 (squares having a number and mark, and lines defining the squares), on which chips are to be bet, by directly pushing the bet area 142 on the screen. As a result, the cursor 140 is moved to the bet area 142 thus designated.

Subsequently, upon pushing any one of the bet unit buttons 136 (1-bet button 136A, 5-bet button 136B, 10-bet button 136C, and 100-bet button 136D), the amount of chips that correspond to the bet unit buttons are bet on the bet area 142 thus designated. For example, upon pushing the 10-bet button 136C four times, pushing the 5-bet button 136B once, and pushing the 1-bet button 136A three times, a total of 48 chips can be bet.

Next, the second bet screen 133 is described with reference to FIG. 5. On the wheel-type betting board 132 displayed on the second bet screen 133, the same numbers "0", and "1" to "36" disposed on the marks 24 are displayed in a wheel-type arrangement, which is the same as an actual roulette wheel 12.

Below the wheel-type betting board 132, similar to the first bet screen 131 as described above, the result history display unit 145, the screen switching button 146, the bet unit button 147, the payout result display unit 148, and the credit amount display unit 149 are displayed.

The result history display unit 145 displays the results of the winning numbers of the past games up to and including the preceding game in the form of a list. The term "one game" as used here represents a series of stages from a stage in which the players place bets via the satellites 4, up to a stage in which credits are paid out according to the winning number after the ball 11 has fallen into a pocket 23. With such an arrangement, upon completing one game, a new winning number is added to the top field of the list, which has the capacity to allow the players to confirm the history of the winning numbers for a maximum of 16 games.

Furthermore, as described above, the screen switching button 146 is a button that switches the display between the first bet screen 131 and the second bet screen 133 displayed on the image display device 7. Then, when the player presses the screen switching button 146 on the liquid crystal screen, it is possible to display the first bet screen 131 using the table-type betting board 130 and the second bet screen 133 using the wheel-type betting board 132 by switching therebetween. Then, the player bets a chip based on the betting board on the screen that is currently displayed.

The bet unit buttons 147 are buttons that allow the player to place bets using chips on the bet area 152 (on the number display portion 154 on which numbers are displayed) designated by the player. The bet unit button is configured with four kinds of buttons including a 1-bet button 147A, a 5-bet button 147B, a 10-bet button 147C, and a 100-bet button 147D. With such an arrangement, first, the player designates the desired bet area 152 on which bets are to be placed by using a player's finger to directly push the screen. Then, a cursor 159 (described later) is disposed in the bet area 152 thus designated.

It should be noted that, in the wheel-type betting board 132 of the second bet screen 133, each bet area 152 in which a chip is bet is provided to each number thus displayed. In this stage, upon the player pushing the 1-bet button 147A, chips are bet in increments of one chip (the amount of chips bet is incremented in the order of "1", "2", "3", . . . for each time the player pushes the 1-bet button 147A with the player's finger or the like). Upon the player pushing the 5-bet button 147B, chips are bet in increments of five chips (the amount of chips bet is incremented in the order of "5", "10", "15", . . . for each time the player pushes the 5 bet button 147B with the player's finger or the like). Upon the player pushing the 10-bet button 147C, the chips are bet in increments of ten chips (the amount of chips bet is incremented in the order of "10", "20", "30", . . . for each time the player pushes the 10-bet button 147C with the player's finger or the like). Upon the player pushing the 100-bet button 147D, the chips are bet in increments of one hundred chips (the amount of chips bet is incremented in the order of "100", "200", "300", . . . for each time the player pushes the 100-bet button 147D with the player's finger or the like). Such an arrangement simplifies the operation required for betting a large amount of chips.

In addition, the number of chips bet and the payout credit amount for a player in a previous game are displayed in the payout result display unit 148. Here, a number obtained by subtracting the amount bet from the payout credits is the credits which the player has newly obtained by the previous game.

Furthermore, a credit amount display unit 149 displays the amount of credits which the player currently possesses. The credit amount decreases according to the number of chips bet (1 credit amount for 1 chip) when the player bets chips. Furthermore, in a case in which the number of the bet area 152 that the player placed a bet has won and credits are paid out, the credit amount is incremented by the credit amount thus paid out. It should be noted that the game is over in a case where the credit amount that the player possesses becomes zero.

A bet range setting unit 151 is provided at the right side on the wheel-type betting board 132 of the second bet screen. The bet range setting unit 151 is a unique function of the wheel-type betting board 132 and it is possible to place a bet not only on the bet area 152 thus designated, but also on the periphery thereof simultaneously by setting the bet range at the bet range setting unit 151. The bet range setting unit 151 is configured with seven types of buttons which includes: a 1 range setting button 151A; a 3 range setting button 151B, a 5 range setting button 151C, a 7 range setting button 151D, a 9 range setting button 151E, a 11 range setting button 151F, a 15 range setting button 151G, and thus a bet range can be set to "1", "3", "5", "7", "9", "11", and "15", respectively. Here, a bet range represents the number of total bet areas including the bet area 152 to be selected (described later) and the bet area 152 that is disposed at both sides thereof and can be bet simultaneously.

Figure 6:
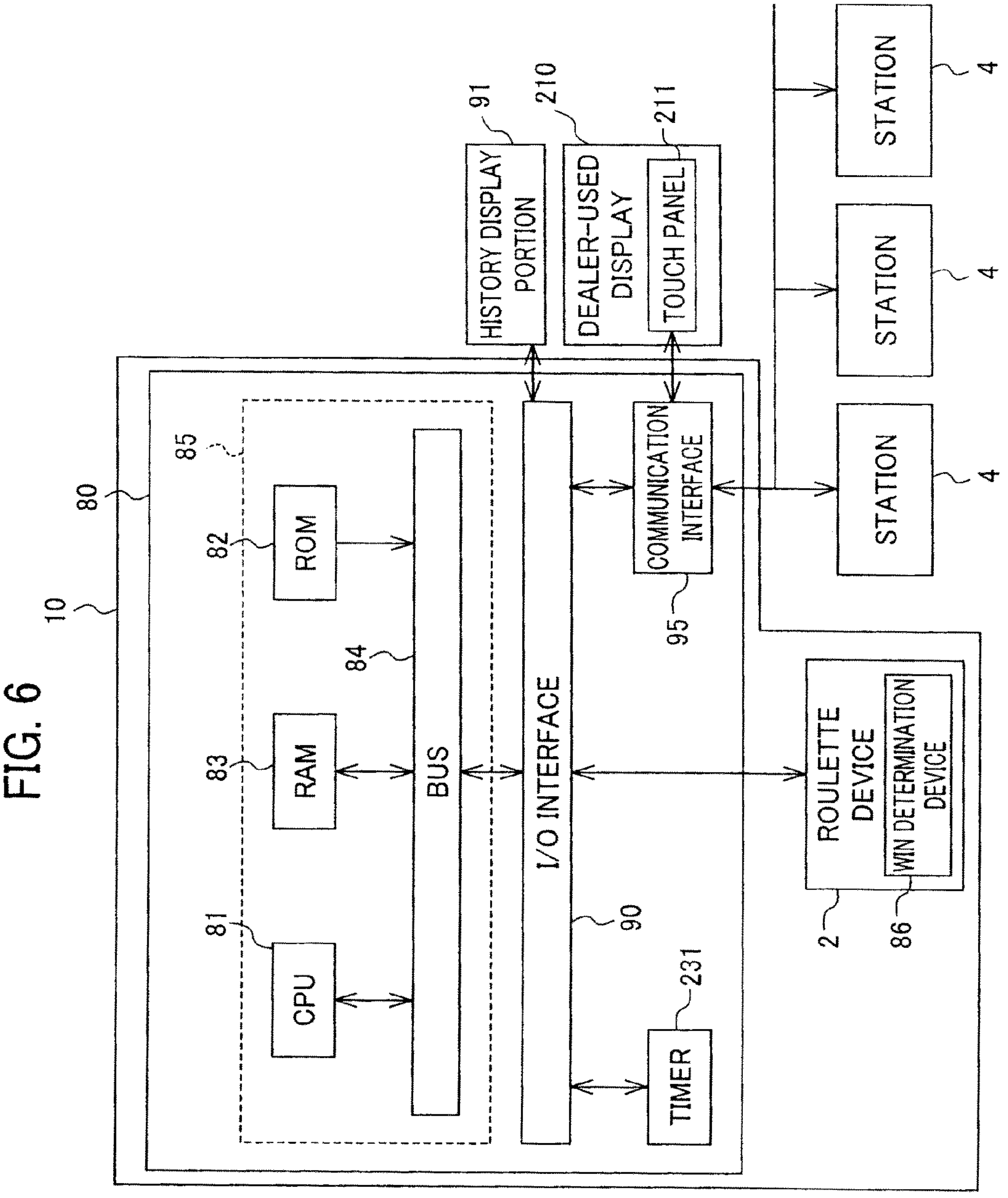
FIG. 6 is a block diagram showing the internal configuration of the game device shown in FIG. 2.

FIG. 6 a block diagram showing the internal configuration of the game device 1 shown in FIG. 2.

A main control unit 80 included in the roulette game control unit 10 of the game device 1 has a microcomputer 85 that is mainly configured with a CPU 81, ROM 82, RAM 83, and a bus 84 that carries out data transmission between each of these.

The CPU 81 is connected via the I/O interface 90 to a timer 231 capable of measuring time. Furthermore, the CPU 81 is connected to a win determination device 86 included in the roulette device 2 via the I/O interface 90.

In addition, a communication interface 95 is connected to the I/O interface 90, and the main control unit 80 transmits and receives bet information, dividend information and the like between each station 4 and transmits and receives a ball-throwing instructional image, a ball-throwing instruction signal, and the like between the dealer-used display 210, via this communication interface 95. The dealer-used display 210 includes a touch panel 211.

Furthermore, a history display portion 91 is connected to the I/O interface 90, and the main control unit 80 performs transmission and reception of data such as winning numbers between the history display portion 91.

In addition, the CPU 81 carries out various processing based on input signals supplied from the respective stations 4 as well as on data and programs stored in the ROM 82 and the RAM 83, and transmits a command signal to the stations 4 based on the result of the above described processing so as to mainly control the respective stations 4, thereby advancing the game. Furthermore, the CPU 81 drives a drive motor provided to the roulette device 2, thereby causing the ball 27 to be launched and roll, and controls the win determination device 86 that specifies a location where the ball falls, thereby determining a winning number corresponding to the position where the ball fell. The determination is performed for each bet chip based on a winning number obtained at the roulette device 2, and the bet information transmitted from each of the stations 4. Furthermore, the credit amount which is to be paid out at each of the stations is calculated.

The ROM 82 in the main control unit 80 stores a program for implementing basic features of the game device 1, and more specifically programs such as for controlling a drive motor that drives the roulette device 2 and controlling each station 4, and also stores a table that controls a payout rate that is set in each of betting modes, a table that controls processing according to values of the timer 231, and the like.

The RAM 83 is memory that temporarily stores various data computed by the CPU 81, and temporarily stores bet information transmitted from each station 4, a winning number of the roulette device 2 determined by the sensor, data related to the results of processing executed by the CPU 81, and the like, for example.

Figure 7:
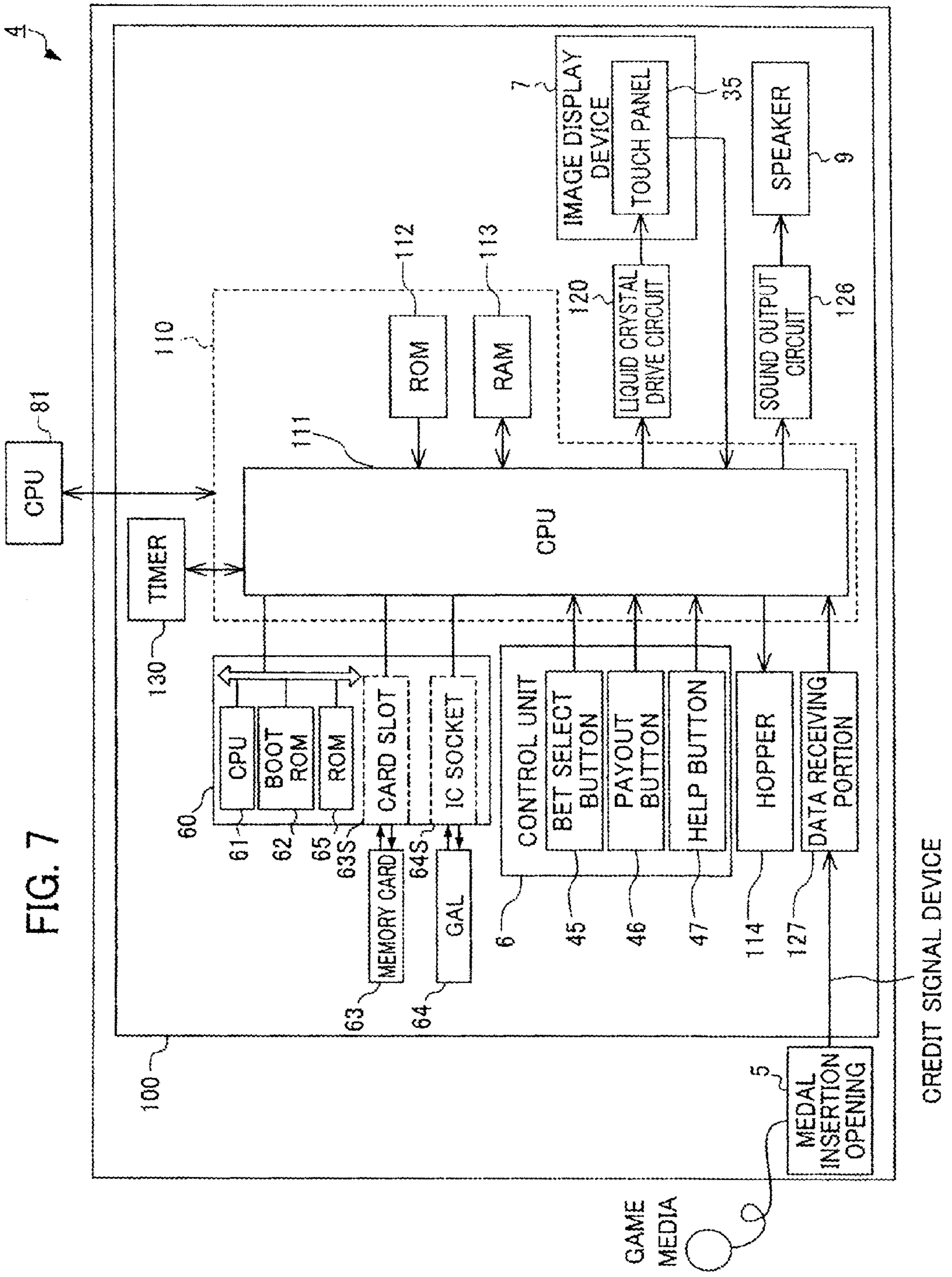
FIG. 7 is a block diagram showing an internal configuration of the station shown in FIG. 2.

FIG. 7 is a block diagram showing an internal configuration of the station 4 shown in FIG. 2. The station 4 is provided with a body portion 100 in which the image display device 7 is provided, and a game media receiving device 5 installed in the body portion 100. Furthermore, the body portion 100 is provided with a station control portion 110 and a few pieces of peripheral equipment.

The station control portion 110 is provided with a CPU 111, ROM 112, and RAM 113.

The ROM 112 stores programs for implementing basic functions of the station 4, various programs necessary for control of the station 4, data tables, and the like.

A bet select button 47, a payout button 48, and a help button 49 provided in the control unit 7 (see FIG. 2) are connected to CPU 111, respectively. Then, the CPU 111 controls the various corresponding operations that should be executed according to the operation signal output by pressing each button and the like. More specifically, various processing is executed based on an input signal supplied from the control portion 7 in response to an operation of a player having been input, as well as data and programs stored in the ROM 112 and RAM 113, and the result thereof is sent to the abovementioned CPU 81.

Furthermore, the CPU ill receives command signals from the CPU 81 of the main control unit 80, and controls peripheral devices configuring the station 4. In addition, the CPU 111 executes various processing based on input signals supplied from the control portion 6 and touch panel 35, as well as data and programs stored in the ROM 112 and RAM 113. Then, the peripheral devices configuring the station 4 are controlled based on the results of the processing. It should be noted that the mode in which processing is performed is set for each type of processing depending on the content of the processing. For example, game media payout processing corresponds to the former, and BET operation processing by a player corresponds to the latter.

A hopper 114, which is connected to the CPU 111, pays out a predetermined number of game media through the payout opening 8 based on the instruction signals from the CPU 111.

The image display device 7 is connected to the CPU 11 via a liquid crystal drive circuit 120. The liquid crystal drive circuit 120 includes program ROM, image ROM, an image control CPU, work RAM, a video display processor (VDP), video RAM, and the like. Programs for image control related to display on the image display device 7, and various selection tables are stored in the program ROM. The image ROM stores dot data for creating an image to be displayed by the image display device 7, for example. In addition, the image control CPU performs determination of an image to be displayed on the image display device 7 from among dot data stored beforehand in the image ROM, based on parameters set by the CPU 111, according to the image control program stored beforehand in the program ROM. In addition, the work RAM is configured as a temporary storage means for when the image control program is executed by the image control CPU. Moreover, the VDP forms an image according to display contents determined by the image control CPU, and performs output thereof to the image display device 7. It should be noted that the video RAM is configured as a temporary storage means for when an image is formed by the VDP.

As mentioned above, the touch panel 35 is attached to the front side of the image display unit 7, and the information related to operation on the touch panel 35 is transmitted to CPU 111. The touch panel 35 detects an input operation by a player on the bet screen 40 and the like. More specifically, selections of a normal bet area 41 and a side bet area 42 on the bet screen 40, input of the unit bet button 43, and the like are performed by operations of touching the touch panel 35, and this information is transmitted to the CPU 111. Then, based on this information, bet information of the player is stored in the RAM 113. In addition, the bet information is transmitted to the CPU 81 in the main control unit 80, and stored in a bet information storage area in RAM 83.

Furthermore, a sound output circuit 126 and speaker 9 are connected to the CPU 111, and the speaker 9 generates various sound effects when performing various renderings based on output signals from the sound output circuit 126. In addition, a game media receiving device 5, which is a device that receives money and game media such as medals, is connected to the CPU 111 via a data receiving portion 127. The data receiving portion 127 receives a credit signal sent from the game media receiving device 5, and the CPU 111 adds a number of credits of a player stored in the RAM 113 based on the credit signal thus sent.

A timer 231, which is capable of measuring time, is connected to the CPU 111.

A gaming board 60 is provided with a CPU (Central Processing Unit) 61, ROM 65 and boot ROM 62, a card slot 63S compliant with a memory card 63, and an IC socket 64S compliant with GAL (Generic Array Logic) 64, which are mutually connected by an internal bus.

The memory card 63 consists of non-volatile memory such as compact flash (registered trademark), and stores a game program and a game system program.

In addition, the card slot 63S is configured so that the memory card 63 can be inserted thereinto, and is connected to the CPU 111 by an IDE bus. Therefore, it is also possible to change the type of game performed by the station 4 and contents by pulling the memory card 63 out from the card slot 63S, writing a different game program and game system program onto the memory card 63, and inserting this memory card 63 into the card slot 63S. In addition, it is possible to change the type of game performed by the station 4 and contents by replacing the memory card 63 on which one game program and game system program are stored with a memory card 63 on which a different game program and game system program are stored. A program related to game advancement and the like are included in the game program. In addition, image data, sound data and the like output during a game are included in the game program.

The GAL 64 is a type of PLD having an OR fixed array structure. The GAL 64 is provided with a plurality of input ports and output ports, and when predetermined data is input to an input port, data corresponding to this data is output from an output port. In addition, the IC socket 64S is configured so that the GAL 64 is detachable, and is connected to the CPU 111 by a PCI bus.

The CPU 61, ROM 65 and boot ROM 62, which are mutually connected by an internal bus, are connected to the CPU 111 by the PCI bus. The PCI bus performs signal transfer between the CPU 111 and the gaming board 60, and carries out electric power supply from the CPU 111 to the gaming board 60. Country identifying information and an authentication program are stored in the ROM 65. A preliminary authentication program, program (boot code) for the CPU 61 to start the preliminary authentication program, and the like are stored in the boot ROM 62.

The authentication program is a program (tamper checking program) for authenticating the game program and game system program. The authentication program is written in accordance with a sequence (authentication sequence) in which confirmation and verification that the game program and game system program, which are the targets of authentication processing, have not been tampered are performed, i.e. authentication of the game program and game system program. The preliminary authentication program is a program for authenticating the authentication program described above. The preliminary authentication program is written in accordance with a sequence (authentication sequence) in which verification that the authentication program, which is the target of authentication processing, has not been tampered is performed, i.e. authentication of the authentication program.

Figure 8:
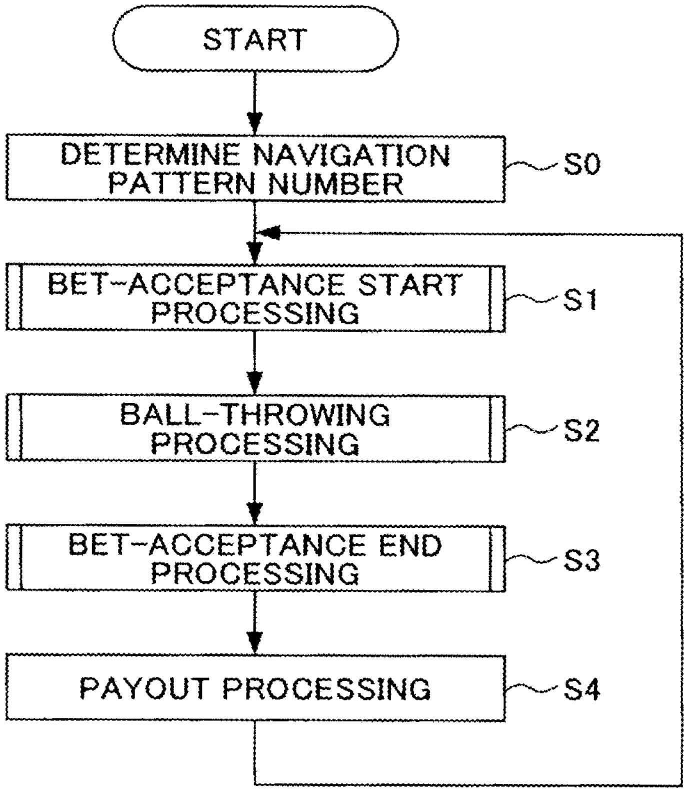
FIG. 8 is a flowchart showing a roulette game processing according to the present invention.

FIG. 8 is a flowchart showing roulette game processing.

In Step S0, the CPU 81 executes navigation-pattern number determination processing. More specifically, the CPU 81 displays a navigation pattern select image (described later in FIG. 20) on the dealer-used display 210, receives from the dealer-used display 210 pattern number data in accordance with a contact location of the touch panel 211 by a facility manager, dealer or the like, and stores the pattern number data thus received in the RAM 83. For example, in the navigation pattern select image in FIG. 20 (described later), in a case in which a Pattern 1 is touched, a pattern number data of "Pattern 1" is stored in the RAM 83.

In Step S1, the CPU 81 executes bet-acceptance start processing described later in FIG. 9, and in Step S2, executes ball-throwing processing described later in FIG. 10. In Step S3, the CPU 81 executes bet-acceptance end processing described later in FIG. 11, and in Step S4, executes payout processing, and returns the processing to Step S1. It should be noted that a fourth time (a time from when a unit game ends) is counted by the timer 231 from the time when Step S4 ends.

Figure 9:
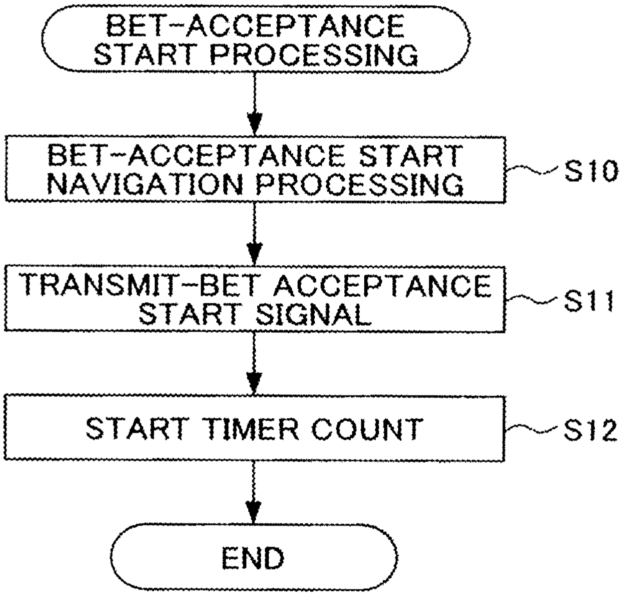
FIG. 9 is a flowchart showing bet-acceptance start processing according to the present invention.

FIG. 9 is a flowchart showing bet-acceptance start processing.

Figure 19:
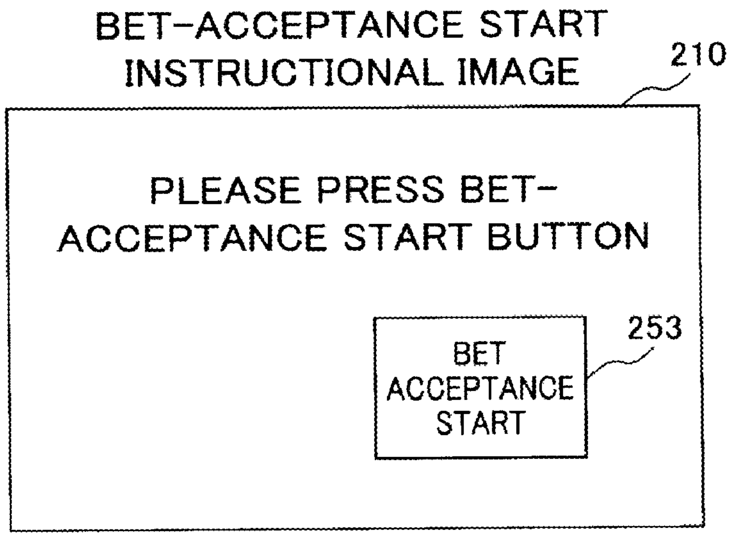
FIG. 19 is a diagram showing a bet-acceptance start instructional image according to the present invention.

In Step S10, the CPU 81 executes bet-acceptance start navigation processing. More specifically, the CPU 81 refers to a navigation pattern table described later in FIG. 17, and acquires navigation pattern data corresponding to pattern number data stored in the RAM 83 in Step S0 of FIG. 8. In a case in which, among the navigation pattern data thus acquired, data stored in a bet start column is "X", the CPU 81 does not perform processing of displaying an instructional image. On the other hand, in a case in which data stored in the bet start column is "O", the CPU 81 reads from the ROM 82 image data of the bet-acceptance start instructional image described later in FIG. 19, and transmits it to the dealer-used display 210. At this time, a bet-acceptance start instructional image described later in FIG. 19 is displayed on the dealer-used display 210. According to FIG. 17 described later, in a case in which the pattern number data stored in the RAM 83 is "Pattern 3", the data stored in the bet start column is "O".

In this way, the dealer can determine the coming of a timing to start accepting a bet. Furthermore, when the bet-acceptance start button 253 (described later in FIG. 19) displayed on the dealer-used display 210 is touched by the dealer, the dealer-used display 210 transmits a signal indicating that acceptance of bets is started to the main control unit 80.

It should be noted that the processing of Step S10 refers to a fourth timing table described later in FIG. 18, and is executed at a timing when the fourth time counted by the timer 231 from the end time of the previous game (from when the processing of Step S4 ended) reaches a time stored in the fourth time column of the fourth timing table (10 seconds in the present embodiment).

In Step S11, the CPU 81 performs bet-acceptance start signal transmission processing. More specifically, the CPU 81 transmits a signal indicating starting acceptance of bets to each station 4. After this processing, a bet from each station 4 is accepted In Step S12, the CPU 81 performs timer-count start processing. More specifically, a first time (a time from when acceptance of a bet from each station 4 is started) is counted by the timer 231. When this processing ends, the CPU 81 ends bet-acceptance start processing.

Figure 10:
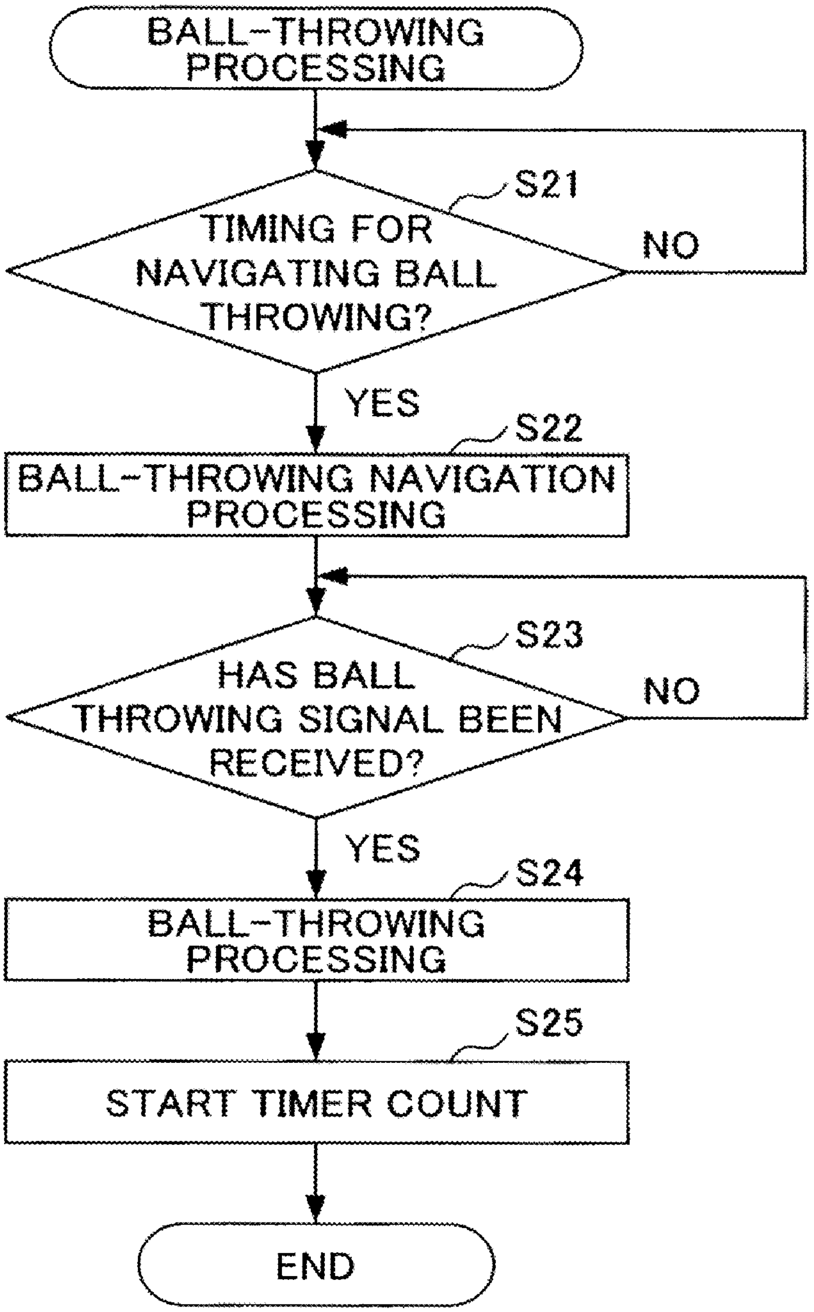
FIG. 10 is a flowchart showing ball-throwing processing according to the present invention.

FIG. 10 is a flowchart showing ball-throwing processing.

In Step S21, the CPU 81 determines whether it is the timing for navigating a ball throwing. More specifically, the CPU 81 refers to a first timing table described later in FIG. 13, and determines whether a first time (a time from when acceptance of bets from each station starts) counted by the timer 231 has reached a time stored in the first time column of the first timing table (5 seconds in the present embodiment). In the case of this determination being YES, the processing advances to Step S22, and in the case of this determination being NO, the processing advances to Step S21.

Figure 15:
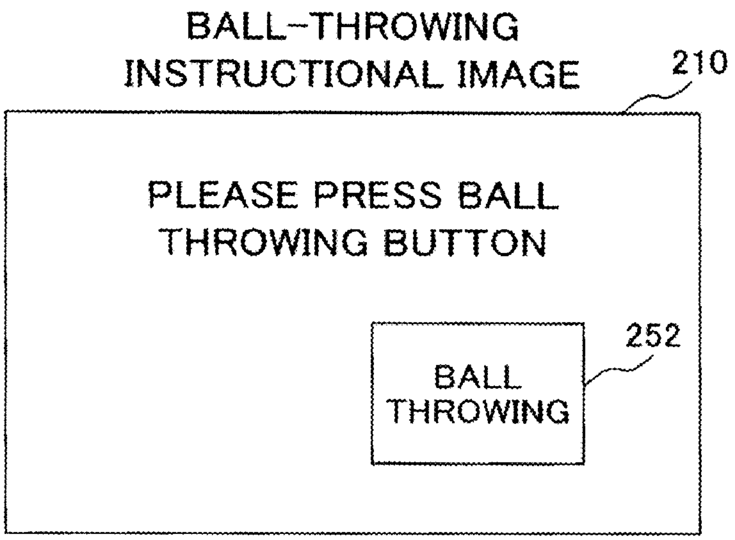
FIG. 15 is a diagram showing a ball-throwing instructional image according to the present invention.

In Step S22, the CPU 81 executes ball-throwing navigation processing. More specifically, the CPU 81 refers to a navigation pattern table described in FIG. 17, and acquires navigation pattern data corresponding to pattern number data stored in the RAM 83 in Step S0 of FIG. 8. In a case in which, among the navigation pattern data thus acquired, data stored in the ball throwing column is "X", the CPU 81 does not perform processing of displaying an instructional image. On the other hand, in a case in which data stored in the ball throwing column is "O", the CPU 81 reads from the ROM 82 image data of the ball-throwing instructional image described in FIG. 15, and transmits it to the dealer-used display 210. At this time, the ball-throwing instructional image described later in FIG. 15 is displayed on the dealer-used display 210. According to FIG. 17 described later, in a case in which the pattern number data stored in the RAM 83 is "Pattern 3", the data stored in the ball throwing column is "X".

In this way, the dealer can determine the coming of the timing to throw the ball 27. Furthermore, when the ball-throwing button 252 (described later in FIG. 15) displayed on the dealer-used display 210 is touched by the dealer, the dealer-used display 210 transmits a signal indicating throwing the ball 27 to the main control unit 80.

In Step S23, the CPU 81 determines whether the ball-throwing signal has been received. More specifically, the CPU 81 determines whether the signal indicating throwing the ball 27 has been received from the dealer-used display 210. In the case of this determination being YES, the processing advances to Step S24, and in the case of this determination being NO, the processing advances to Step S23.

In Step S24, the CPU 81 executes ball-throwing processing. More specifically, the CPU 81 drives a ball throwing device (not shown), and throws the ball 27 onto the wheel 22 from the ball insertion opening 36.

Figure 11:
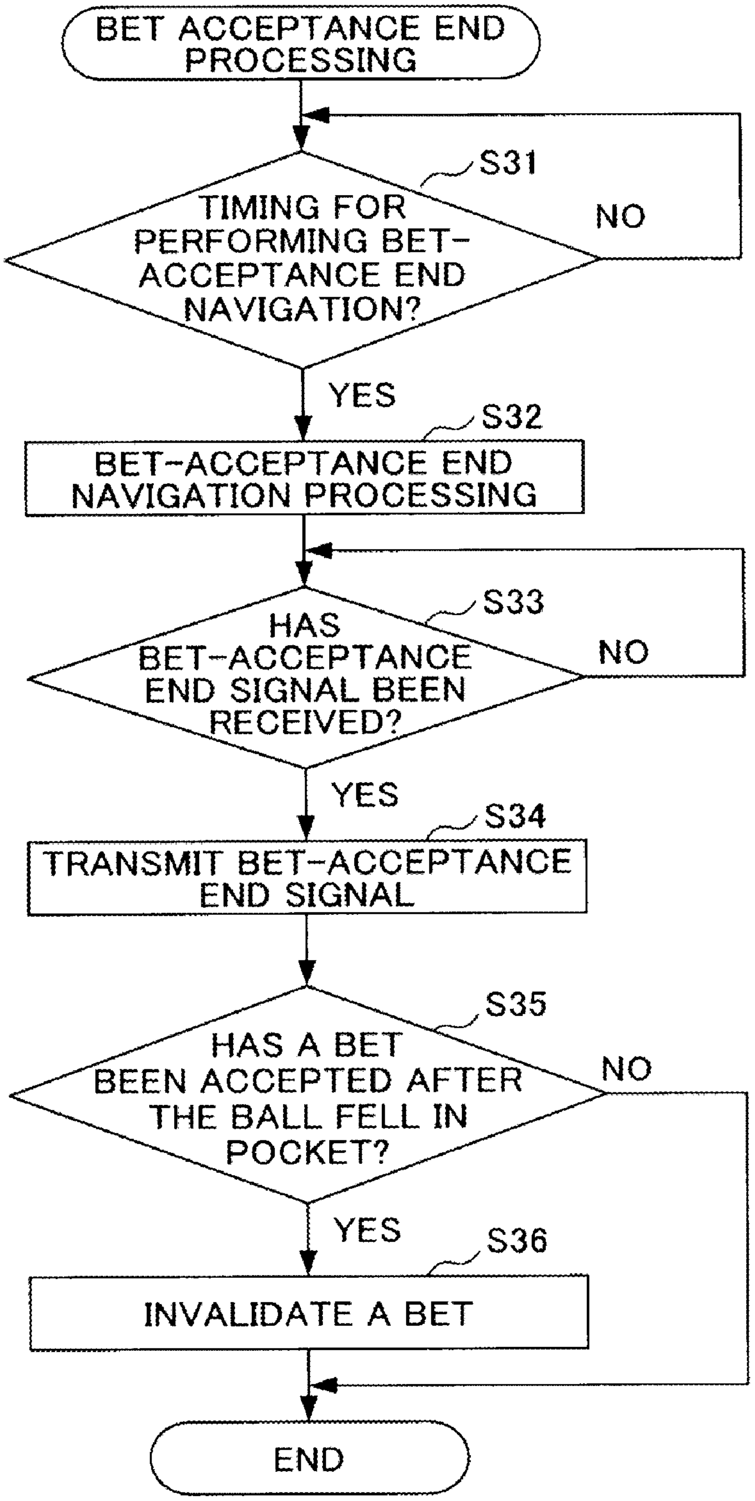
FIG. 11 is a flowchart showing bet-acceptance end processing according to the present invention.

In Step S25, the CPU 81 performs timer-count start processing. More specifically, the CPU 81 causes the timer 231 to count the second time (a time from when the ball 27 is thrown) and the third time (from when the ball 27 is thrown until a bet is accepted from each of the plurality of stations 4). That is, in each station 4, a third time exists, and thus multiple third times exist. Upon ending the processing, the CPU 81 ends the ball-throwing processing. FIG. 11 is a flowchart showing bet-acceptance end processing.

In Step S31, the CPU 81 determines whether it is the timing for navigating a bet acceptance end. More specifically, the CPU 81 refers to a second timing table described later in FIG. 14, and determines whether the second time (a time from when the ball 27 is thrown) counted by the timer 231 has reached a time stored in the second time column of the second timing table. This determination is made according to a ball-speed setting value (described later in FIGS. 12 and 14) for each throwing speed of the ball 27. In the case of this determination being YES, the processing advances to Step S32, and in the case of this determination being NO, the processing advances to Step S31.

Figure 16:
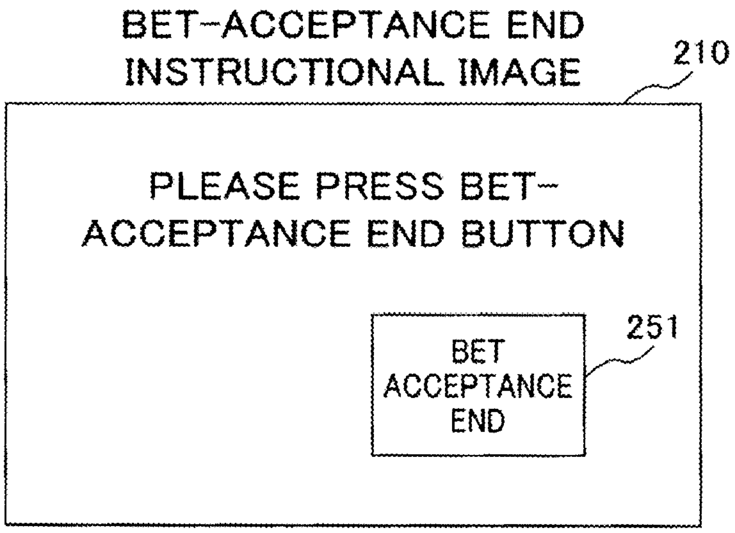
FIG. 16 is a diagram showing a bet-acceptance end instructional image according to the present invention.

In Step S32, the CPU 81 executes bet-acceptance end navigation processing. More specifically, the CPU 81 refers to a navigation pattern table described in FIG. 17, and acquires navigation pattern data corresponding to pattern number data stored in the RAM 83 in Step S0 of FIG. 8. In a case in which, among the navigation pattern data thus acquired, data stored in the bet end column is "X", the CPU 81 does not perform processing of displaying an instruction image. On the other hand, in a case in which data stored in the bet end column is "O", the CPU 81 reads from the ROM 82 image data of the bet-acceptance end instructional image described later in FIG. 16, and transmits it to the dealer-used display 210. At this time, the bet-acceptance end instructional image described later in FIG. 16 is displayed on the dealer-used display 210. According to FIG. 17 described later, in a case in which the pattern number data stored in the RAM 83 is "Pattern 3", the data stored in the bet end column is "O".

In this way, the dealer can determine the coming of the timing for ending acceptance of bets. Furthermore, when the bet-acceptance end button 251 (described later in FIG. 16) displayed on the dealer-used display 210 is touched by the dealer, the dealer-used display 210 transmits a signal indicating ending acceptance of bets to the main control unit 80.

In Step S33, the CPU 81 determines whether the bet-acceptance signal has been received. More specifically, the CPU 81 determines whether a signal indicting ending acceptance of bets has been received from the dealer-used display 210. In a case of this determination being YES, the processing advances to Step S34, and in a case of this determination being NO, the processing advances to Step S33.

In Step S34, the CPU 81 performs bet-acceptance end signal transmission processing. More specifically, the CPU 81 transmits to each station 4 a signal indicating ending acceptance of bets. After this processing, the CPU 81 ends acceptance of bets from each station 4.

In Step S35, the CPU 81 determines whether a bet has been accepted after the ball fell into a pocket. More specifically, the CPU 81 determines whether the third time (from when the ball 27 is thrown until falling into the number pocket 23) (described later in FIG. 12) counted in Step S25 of FIG. 10 is longer than a rolling time of the ball 27 corresponding to the ball speed setting value for each throwing speed of the ball 27, which is stored in the ROM 82 in advance. In the case of this determination being YES, the processing advances to Step S36, and in the case of being NO, bet-acceptance end processing ends.

In Step S36, the CPU 81 executes bet invalidation processing.

By executing this bet-invalidation processing, even in a case in which a bet is placed from a certain station 4 after the ball 27 has fallen in the number pocket 23, the bet from the station 4 can be invalidated.

More specifically, even in a case in which the CPU 81 ends acceptance of bets after the ball 27 has fallen in the number pocket 23 due to the contact timing of the bet-acceptance end button 251 by the dealer being late, the bet placed after the ball fell can be invalidated.

FIG. 12 is a diagram showing a rolling-time table.

According to this rolling-time table, a ball-speed setting value (a value for each throwing speed of the ball 27) and a rolling time (a time from when the ball 27 is thrown until falling in the number pocket 23) are associated.

For example, with the ball-speed setting value being larger, the throwing speed of the ball 27 increases and the rolling time becomes shorter. In the present embodiment, the rolling time is "14 seconds" when the ball-speed setting value is "1", the rolling time is "13 seconds" when the ball speed setting value is "2", the rolling time is "12 seconds" when the ball speed setting value is "3", and the rolling time is "11 seconds" when the ball speed setting value is "4". It should be noted that this ball-speed setting value is determined randomly for each game of the roulette game. The timing to be determined is from when the roulette game processing shown in FIG. 8 is started and up to before the processing of Step S2 (ball-throwing processing) is started.

FIG. 13 is a diagram showing a first timing table.

According to this timing table, a first time (a time from when acceptance of a bet from each station 4 is started) and a content of processing are associated. In the present embodiment, in a case in which the first time counted by the timer 231 has reached 5 seconds, the abovementioned ball-throwing navigation processing (the processing of Step S22 of FIG. 10) is executed.

In the present embodiment, although the ball-throwing navigation processing is configured to be performed when the first time is 5 seconds, the present invention is not limited thereto. It may be longer or shorter than 5 seconds, and may be determined randomly in each game.

FIG. 14 is a diagram showing a second timing table.

According to this second timing table, a second time (a time from when the ball 27 is thrown) and a content of processing are associated for each of the abovementioned ball-speed setting values.

In the present embodiment, in a case in which the ball speed setting value is "1" and the second time counted by the timer 231 reaches 13 seconds, the abovementioned bet-acceptance end navigation processing (the processing in Step S32 of FIG. 11) is executed. Furthermore, the second time is shorter by 1 second than the rolling time. That is, the bet-acceptance end navigation processing is performed 1 second before the ball 27 falls into a number pocket 23.

FIG. 15 is a diagram showing the ball-throwing instructional image.

This ball-throwing instructional image is displayed on the dealer-used display 210 at the timing when the processing of Step S22 of FIG. 10 is executed. Furthermore, the ball-throwing button 252 is displayed on this ball-throwing instructional image, and when the dealer touches the ball-throwing button 252, the touch panel 211 (refer to FIG. 6) detects the contact and transmits from the dealer-used display 210 to the main control unit 80 a signal indicating the ball 27 being thrown.

FIG. 16 is a diagram showing a bet-acceptance end instructional image.

This bet-acceptance end instructional image is displayed on the dealer-used display 210 at a timing when the processing in Step S32 of FIG. 11 is performed. Furthermore, the bet-acceptance end button 251 is displayed on the bet-acceptance end instructional image, and when the dealer touches the bet-acceptance end button 251, the touch panel 211 (refer to FIG. 6) detects the contact and transmits from the dealer-used display 210 to the main control unit 80 a signal indicating ending acceptance of bets.

FIG. 17 is a diagram showing a navigation pattern table.

In this navigation pattern table (stored in the ROM 82), pattern data as to whether various navigations associated with navigation pattern numbers are performed or not are stored.

For example, "O" is pattern data for performing navigation, and "X" is pattern data for not performing navigation. In a case in which the navigation pattern number is "Pattern 3", since "O" is stored in the bet start column, the CPU 81 displays the bet-acceptance start instructional image on the dealer-used display 210. Furthermore, since "X" is stored in the ball throwing column, the CPU 81 does not display the ball-throwing instructional image on the dealer-used display 210. In addition to this, since "O" is stored in the bet end column, the CPU 81 displays the bet-acceptance end instructional image on the dealer-used display 210.

FIG. 18 is a diagram showing a fourth timing table.

According to the fourth timing table, the fourth time (a time from when a previous game ends) and a content of processing are associated. In the present embodiment, in a case in which the fourth time counted by the timer 231 has reached 10 seconds, the abovementioned bet-acceptance start navigation processing (the processing in Step S10 of FIG. 9) is executed.

FIG. 19 is a diagram showing a bet-acceptance start instructional image.

This bet-acceptance start instructional image is displayed on the dealer-used display 210 at a timing when the processing in Step S10 of FIG. 9 is executed. Furthermore, the bet-acceptance start button 253 is displayed in this bet-acceptance start instructional image, and when the dealer touches the bet-acceptance start button 253, the touch panel 211 (refer to FIG. 6) detects the contact and transmits from the dealer-used display 210 to the main control unit 80 a signal indicating starting acceptance of bets.

Figure 20:
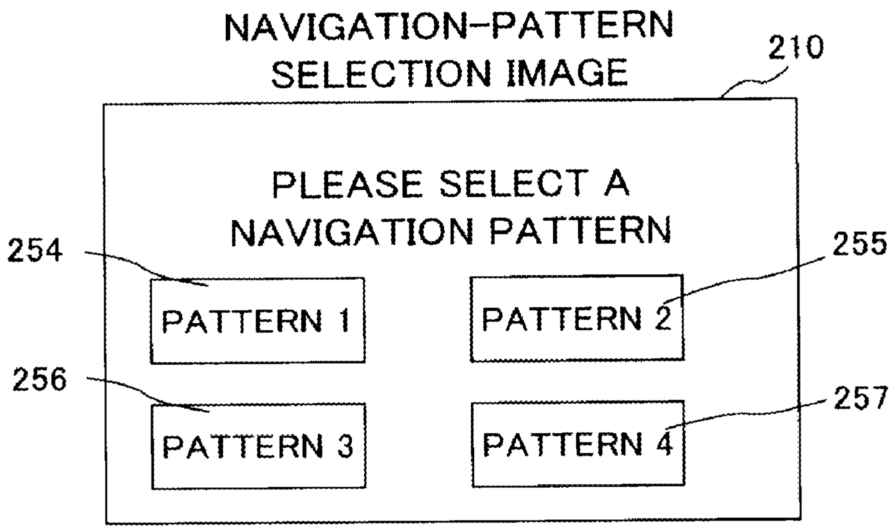
FIG. 20 is a diagram showing a navigation-pattern selection image according to the present invention.

FIG. 20 is a diagram showing a navigation-pattern selection image.

This navigation-pattern selection image is displayed on the dealer-used display 210 at a timing when the processing in Step S0 of FIG. 8 is executed. According to FIG. 20, four patterns from Pattern 1 to Pattern 4 are suggested to a facility manager, a dealer, and the like so as to select. A facility manager, a dealer, and the like can select a navigation pattern by touching any of a Pattern 1 button 254, a Pattern 2 button 255, a Pattern 3 button 256, and a Pattern 4 button 257.

An explanation of the present embodiment has been provided above. In the present embodiment, although displaying the bet-acceptance end instructional image and the like on the dealer-used display 210 allows instructing the dealer to operate the touch panel 211, the present invention is not limited thereto, and may instruct the dealer by providing a lamp as an instructional device at a location visible to the dealer and illuminating the lamp.

In the present embodiment, a case is explained in which the controller of the present invention is configured with the CPU 81 provided to the main control unit 80 and the CPU 111 provided to the station 4; however, the controller of the present invention may be configured with only one CPU.

Although an embodiment of the present invention has been explained above, it is merely exemplified as a specific example, and the present invention is not particularly limited thereto; specific configurations of each means and the like can be suitably modified in design. Moreover, it should be understood that the advantages described in association with the embodiments are merely a listing of most preferred advantages, and that the advantages of the present invention are by no means restricted to those described in connection with the embodiments.

What is claimed is:

1. A gaming system comprising a plurality of stations, a display that is disposed to be viewable to a dealer and displays an instructional image of a game operation input, an operation input device that accepts a game operation input from the dealer and outputs a signal based on the game operation input thus accepted, and a roulette game control unit that performs transmission and reception of information related to a roulette game with the plurality of stations, the display, and the operation input device, and advances the roulette game, wherein the roulette game control unit comprises:

a roulette wheel on which a plurality of marks is disposed;

a ball that rolls on the roulette wheel;

a plurality of pockets that is formed in a circumferential direction of the roulette wheel to correspond to the plurality of marks, and holds the ball;

a timer that counts time;

memory that stores, on a time axis on which the roulette game is advanced based on control of the roulette game control unit, timing data that is used for determining a timing to display on the display the instructional image indicating a timing of an operation by way of the operation input device; and a controller that executes processing of:

(a) counting, upon a trigger that is set in advance, a time by the timer, on a time axis on which the roulette game is advanced based on control of the roulette game control unit; and (b) displaying on the display an instructional image stored to be associated with the timing data, in response to a time counted by the timer matching a time indicated by timing data stored in the memory.

2. A gaming system comprising a plurality of stations, a display that is disposed to be viewable to a dealer and displays an instructional image of a game operation input, an operation input device that accepts a game operation input from the dealer and outputs a signal based on the game operation input thus accepted, and a roulette game control unit that performs transmission and reception of information related to a roulette game with the plurality of stations, the display, and the operation input device, and advances the roulette game, wherein the roulette game control unit comprises:

a roulette wheel on which a plurality of marks is disposed;

a ball that rolls on the roulette wheel;

a plurality of pockets that is formed in a circumferential direction of the roulette wheel to correspond to the plurality of marks, and holds the ball;

memory that stores in advance first timing data that is associated with processing to display on the display an instructional image of an operation input for throwing the ball on the roulette wheel and second timing data that is associated with processing to display on the display an instructional image of an operation input for ending acceptance of a bet;

a timer that counts time; and a controller that performs processing of:

(a) starting acceptance of a bet from each of the plurality of stations;

(b) counting a first time by the timer upon the processing of (a);

(c) referring to the memory, and displaying on the display an instructional image of an operation input for throwing the ball on the roulette wheel in response to a first time counted by the timer matching a time indicated by first timing data;

(d) throwing the ball on the roulette wheel in response to reception of a signal indicating the ball being thrown from the operation input device;

(e) counting a second time by the timer upon the processing of (d);

(f) referring to the memory, and displaying on the display an instructional image of an operation input for ending acceptance of a bet in response to the second time counted by the timer matching a time indicated by the second timing data; and (g) ending acceptance of a bet from each of the plurality of stations in response to reception of a signal indicating the acceptance of a bet being ended from the operation input device having been received.

3. A gaming system according to claim 2, wherein the memory stores in advance a time from when the ball is thrown until the ball is held in the pocket, to correspond to a speed of the ball, and the controller executes the following processing of:

(h) counting a third time from when the ball is thrown until a bet is accepted from each of the plurality of stations by the timer in each of the plurality of stations in response to the processing of (d);

(i) determining, for each of the plurality of stations, whether the third time counted by the timer is longer than a time from when the ball is thrown until held in the pocket stored in the memory; and (j) invalidating a bet from a station which is determined to be longer in the processing of (i).

* * * * *